United States Patent
Raman et al.

(10) Patent No.: US 10,904,124 B2
(45) Date of Patent: Jan. 26, 2021

(54) SYSTEM AND METHOD FOR DYNAMIC STOPPING OF CLOUD-BASED PROVISIONING REQUESTS

(71) Applicant: International Business Machines Corporation, Armonk, NY (US)

(72) Inventors: Rajan Raman, Bangalore (IN); Rohit Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/183,024

(22) Filed: Nov. 7, 2018

(65) Prior Publication Data

US 2020/0145312 A1 May 7, 2020

(51) Int. Cl.
*H04L 12/26* (2006.01)
*H04L 29/08* (2006.01)

(52) U.S. Cl.
CPC ........ *H04L 43/103* (2013.01); *H04L 67/2809* (2013.01)

(58) Field of Classification Search
CPC ..... H04L 43/10; H04L 43/103; H04L 67/025; H04L 67/28; H04L 67/2809
USPC ...................................................... 709/223
See application file for complete search history.

(56) References Cited

U.S. PATENT DOCUMENTS

| | | | |
|---|---|---|---|
| 6,594,786 B1* | 7/2003 | Connelly | G06F 11/008 709/224 |
| 6,691,244 B1* | 2/2004 | Kampe | G06F 11/00 714/4.1 |
| 8,181,071 B2 | 5/2012 | Cahill et al. | |
| 8,209,415 B2 | 6/2012 | Wei | |
| 8,396,771 B2 | 3/2013 | Greenspan et al. | |
| 9,203,866 B2 | 12/2015 | Chatterjee et al. | |
| 10,440,053 B2 | 10/2019 | Wyatt et al. | |
| 2007/0280236 A1* | 12/2007 | Yang | H04L 12/185 370/390 |
| 2009/0063667 A1* | 3/2009 | Smith | G06Q 10/02 709/222 |
| 2013/0290407 A1* | 10/2013 | Maiya | G06Q 40/02 709/203 |
| 2014/0059209 A1* | 2/2014 | Alnoor | G06F 9/54 709/224 |
| 2016/0055556 A1 | 2/2016 | Ignatius | |
| 2016/0261478 A1 | 9/2016 | Navasivasakthivelsamy et al. | |
| 2017/0031714 A1 | 2/2017 | Stone et al. | |
| 2017/0041384 A1 | 2/2017 | Son et al. | |
| 2017/0364345 A1* | 12/2017 | Fontoura | G06F 8/65 |
| 2020/0042298 A1* | 2/2020 | Jain | G06F 21/53 |

* cited by examiner

Primary Examiner — Ruolei Zong
(74) Attorney, Agent, or Firm — Robert C. Bunker (57) ABSTRACT

A method, computer program product, and computer system for receiving, at a service broker on a first computing device, a status probe associated with at least a portion of a service, wherein the status probe may be sent from a platform on a second computing device. A response to the status probe may be generated, wherein the response may include a status of at least the portion of the service, and wherein the response may further include additional information. The response may be sent with the status and the additional information to the platform.

17 Claims, 5 Drawing Sheets

SYSTEM AND METHOD FOR DYNAMIC STOPPING OF CLOUD-BASED PROVISIONING REQUESTS

BACKGROUND

Generally, a "service broker" (e.g., service endpoint) may manages the life cycle of services. Platforms may interact with service brokers to provision and manage the service instances. Generally, "platforms" may include software that manages the cloud environment. The platforms may interact with the cloud service(s) through the registered service broker to provision and manage the services requested by a user.

Typically, there are situations when a service broker may need to temporarily stop servicing requests from a platform. For instance, the service broker may be undergoing emergency maintenance. As another example, the platform on which the service broker is hosted may be scheduled to have an emergency maintenance on short notice. As yet another example, the individual service instances may be temporarily brought down to handle situations like, e.g., migrating to a different data center, upgrading of a software version, etc.

BRIEF SUMMARY OF DISCLOSURE

In one example implementation, a method, performed by one or more computing devices, may include but is not limited to receiving, at a service broker on a first computing device, a status probe associated with at least a portion of a service, wherein the status probe may be sent from a platform on a second computing device. A response to the status probe may be generated, wherein the response may include a status of at least the portion of the service, and wherein the response may further include additional information. The response may be sent with the status and the additional information to the platform.

One or more of the following example features may be included. The additional information may include a future expected down time of at least the portion of the service. The additional information may include an expected duration for down time of at least the portion of the service. At least the portion of the service may include at least one of the service and one or more service instances of the service. Subsequent status probes may be received from the platform at a geometric progression of interval frequency. A response to at least one of the subsequent status probes may be generated with updates to the expected duration for down time in the additional information. The additional information may be included in a header of the response to the status probe.

In another example implementation, a computing system may include one or more processors and one or more memories configured to perform operations that may include but are not limited to receiving, at a service broker on a first computing device, a status probe associated with at least a portion of a service, wherein the status probe may be sent from a platform on a second computing device. A response to the status probe may be generated, wherein the response may include a status of at least the portion of the service, and wherein the response may further include additional information. The response may be sent with the status and the additional information to the platform.

One or more of the following example features may be included. The additional information may include a future expected down time of at least the portion of the service. The additional information may include an expected duration for down time of at least the portion of the service. At least the portion of the service may include at least one of the service and one or more service instances of the service. Subsequent status probes may be received from the platform at a geometric progression of interval frequency. A response to at least one of the subsequent status probes may be generated with updates to the expected duration for down time in the additional information. The additional information may be included in a header of the response to the status probe.

In another example implementation, a computer program product may reside on a computer readable storage medium having a plurality of instructions stored thereon which, when executed across one or more processors, may cause at least a portion of the one or more processors to perform operations that may include but are not limited to receiving, at a service broker on a first computing device, a status probe associated with at least a portion of a service, wherein the status probe may be sent from a platform on a second computing device. A response to the status probe may be generated, wherein the response may include a status of at least the portion of the service, and wherein the response may further include additional information. The response may be sent with the status and the additional information to the platform.

One or more of the following example features may be included. The additional information may include a future expected down time of at least the portion of the service. The additional information may include an expected duration for down time of at least the portion of the service. At least the portion of the service may include at least one of the service and one or more service instances of the service. Subsequent status probes may be received from the platform at a geometric progression of interval frequency. A response to at least one of the subsequent status probes may be generated with updates to the expected duration for down time in the additional information. The additional information may be included in a header of the response to the status probe.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

Generally, a "service broker" (e.g., service endpoint) may manages the life cycle of services. Platforms may interact with service brokers to provision and manage the service instances. Generally, "platforms" may include software that manages the cloud environment. The platforms may interact with the cloud service(s) through the registered service broker to provision and manage the services requested by a user.

Typically, there are situations when a service broker may need to temporarily stop servicing requests from a platform. For instance, the service broker may be undergoing emergency maintenance. As another example, the platform on which the service broker is hosted may be scheduled to have an emergency maintenance on short notice. As yet another example, the individual service instances may be temporarily brought down to handle situations like, e.g., migrating to a different data center, upgrading of a software version, etc.

In certain situations, the "devops" team of the service may manually notify the platform team of the non-availability of the service broker or the specific service instances. Typically, even after the notification, little to no changes are made on the platform side, and requests (e.g., users requesting the service or trying to manage a service instance) continue to be sent from the platform to the service broker. Such requests thus generally fail with, e.g., connection time outs or other errors.

This example situation may lead to a very poor user experience. Users requesting the service or trying to manage a service instance may see that their service requests are pending and may have no insight into when the service would be available. Users may then have to reach out through support channels to understand and know what the issue is and when the service again will be available to them, which may be a very expensive proposition for the users and the platform.

Thus, when handled through communication ahead of time (and through human interactions), it is expensive from a resource standpoint, prone to human error (e.g., incorrect or outdated information being given), and the down time may be scheduled for longer than is actually required to handle any exigencies during the down time. Therefore, as will be discussed in greater detail below, when a service broker is planning to go on a scheduled down time for the entire service or to a set of service instances, the service broker may dynamically notify the platform about the start time when it is expected to go do down (when the down time is a planned down time) and the duration of the down time window. The platform may temporarily pause the requests into the service broker if the service itself is going down or may temporarily pause the requests to the service instances if it is a set of service instances going down. The platform may then send the requests to the service broker (only) after it announces that it is fully back up.

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java®, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
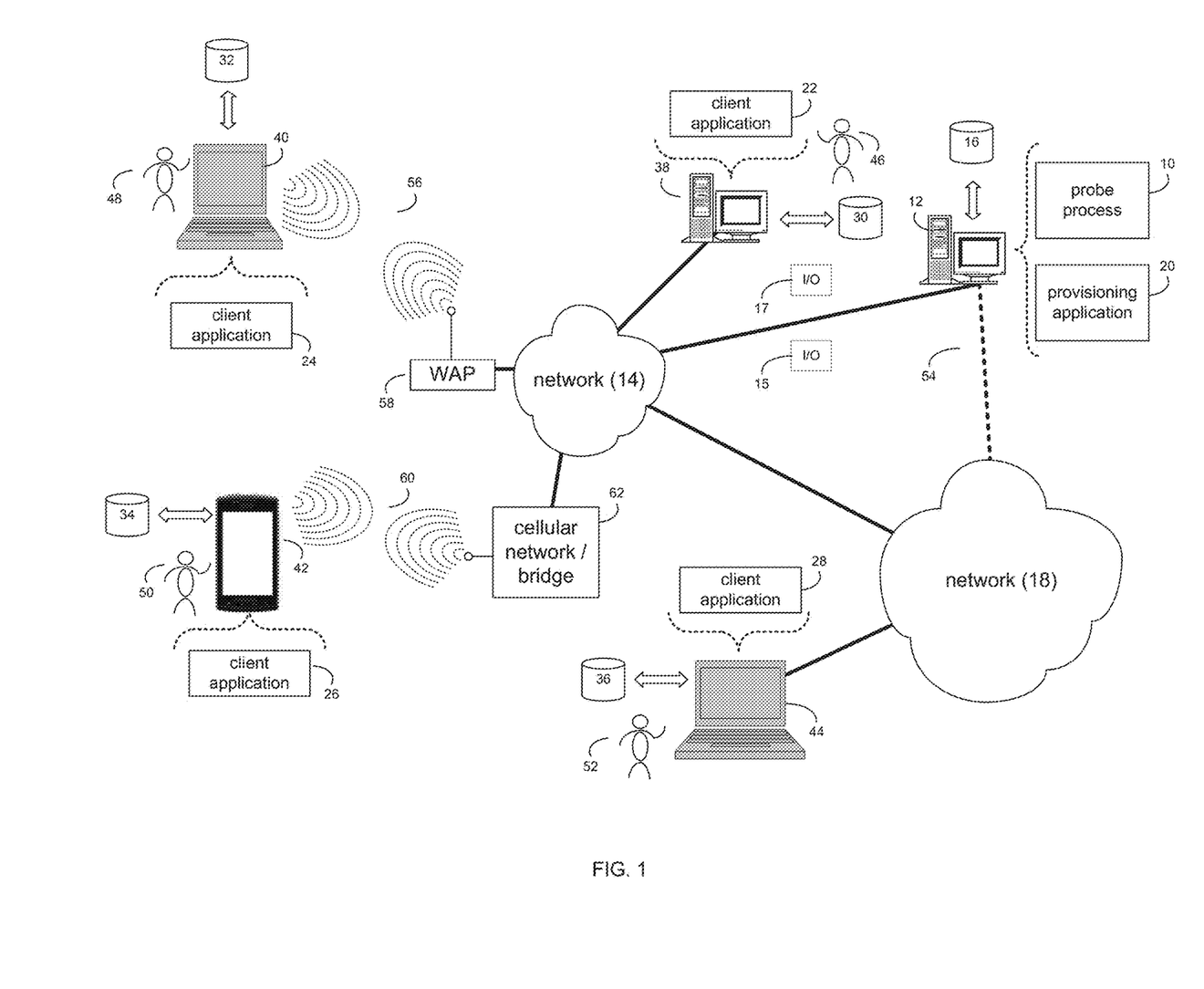
FIG. 1 is an example diagrammatic view of a probe process coupled to an example distributed computing network according to one or more example implementations of the disclosure.

Referring now to the example implementation of FIG. 1, there is shown probe process 10 that may reside on and may be executed by a computer (e.g., computer 12), which may be connected to a network (e.g., network 14) (e.g., the interne or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a probe process, such as probe process 10 of FIG. 1, may receive, at a service broker on a first computing device, a status probe (e.g., I/O 15) associated with at least a portion of a service, wherein the status probe may be sent from a platform on a second computing device. A response (e.g., I/O 17) to the status probe may be generated, wherein the response may include a status of at least the portion of the service, and wherein the response may further include additional information. The response may be sent with the status and the additional information to the platform.

In some implementations, the instruction sets and subroutines of probe process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, probe process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a provisioning application (e.g., provisioning application 20), examples of which may include, but are not limited to, e.g., a service broker application, a platform application, or other application that allows for the (e.g., cloud-based) management of the lifecycle of services (and their instances). In some implementations, probe process 10 and/or provisioning application 20 may be accessed via one or more of client applications 22, 24, 26, 28. In some implementations, probe process 10 may be a standalone application, or may be an applet/application/script/extension that may interact with and/or be executed within provisioning application 20, a component of provisioning application 20, and/or one or more of client applications 22, 24, 26, 28. In some implementations, provisioning application 20 may be a standalone application, or may be an applet/application/script/extension that may interact with and/or be executed within probe process 10, a component of probe process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of probe process 10 and/or provisioning application 20. Examples of client applications 22, 24, 26, 28 may include, but are not limited to, e.g., a service broker application, a platform application, or other application that allows for the (e.g., cloud-based) management of the lifecycle of services (and their instances), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of probe process 10 (and vice versa). Accordingly, in some implementations, probe process 10 may be a purely server-side application, a purely client-side application, or a hybrid server-side/client-side application that is cooperatively executed by one or more of client applications 22, 24, 26, 28 and/or probe process 10.

In some implementations, one or more of client applications 22, 24, 26, 28 may be configured to effectuate some or all of the functionality of provisioning application 20 (and vice versa). Accordingly, in some implementations, provisioning application 20 may be a purely server-side application, a purely client-side application, or a hybrid server-side/client-side application that is cooperatively executed by one or more of client applications 22, 24, 26, 28 and/or provisioning application 20. As one or more of client applications 22, 24, 26, 28, probe process 10, and provisioning application 20, taken singly or in any combination, may effectuate some or all of the same functionality, any description of effectuating such functionality via one or more of client applications 22, 24, 26, 28, probe process 10, provisioning application 20, or combination thereof, and any described interaction(s) between one or more of client applications 22, 24, 26, 28, probe process 10, provisioning application 20, or combination thereof to effectuate such functionality, should be taken as an example only and not to limit the scope of the disclosure.

In some implementations, one or more of users 46, 48, 50, 52 may access computer 12 and probe process 10 (e.g., using one or more of client electronic devices 38, 40, 42, 44) directly through network 14 or through secondary network 18. Further, computer 12 may be connected to network 14 through secondary network 18, as illustrated with phantom link line 54. Probe process 10 may include one or more user interfaces, such as browsers and textual or graphical user interfaces, through which users 46, 48, 50, 52 may access probe process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12), data read requests (e.g., a request that content be read from computer 12), as well as status requests.

Figure 2:
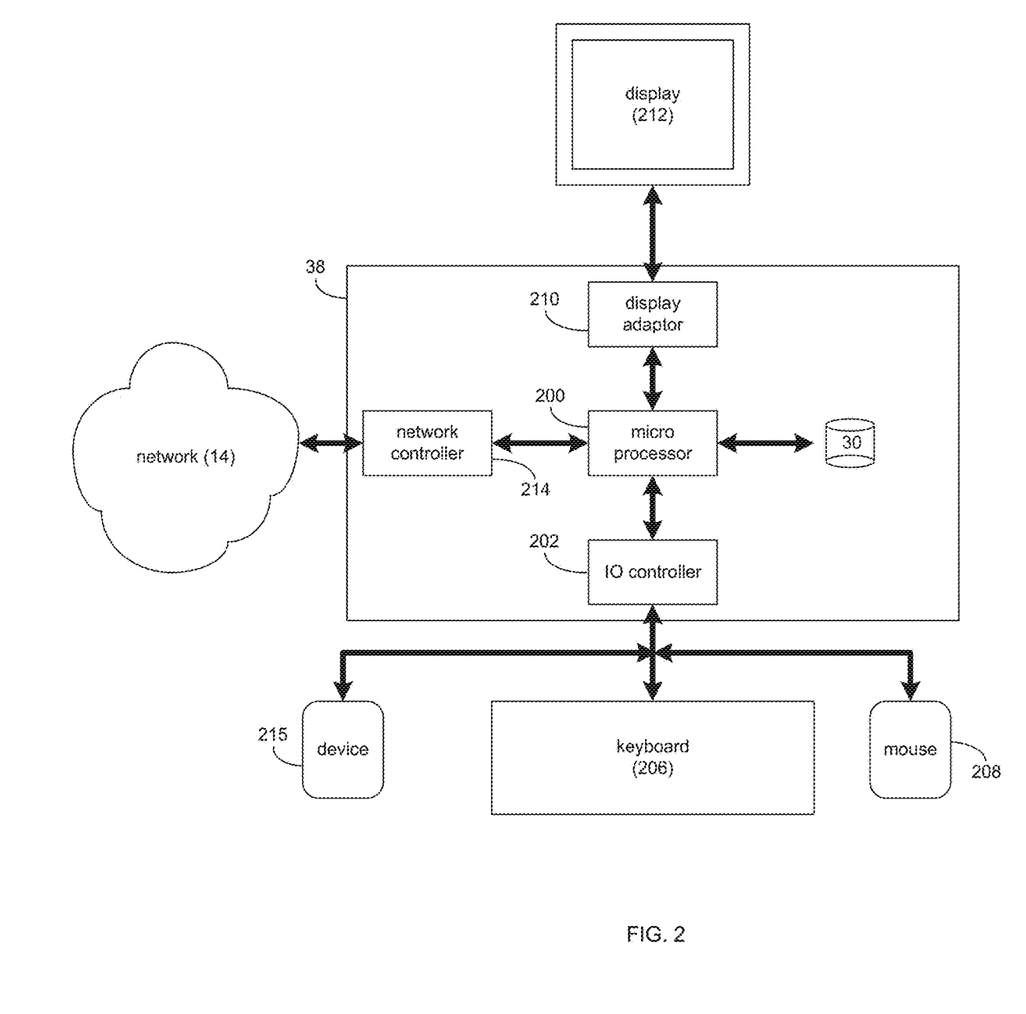
FIG. 2 is an example diagrammatic view of a client electronic device of FIG. 1 according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, probe process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, probe process 10 may at least help, e.g., improve a technology, necessarily rooted in computer technology, in order to overcome an example and non-limiting problem specifically arising in the realm of computer networks. For example, probe process 10 may improve existing technological processes associated with, e.g., cloud-based provisioning services. It will be appreciated that the computer processes described throughout are not considered to be well-understood, routine, and conventional functions.

Figure 3:
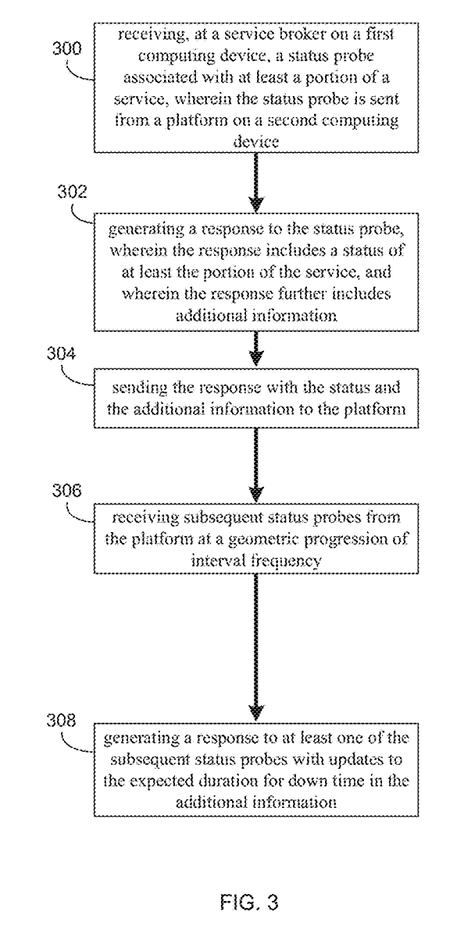
FIG. 3 is an example flowchart of a probe process according to one or more example implementations of the disclosure.
Figure 4:
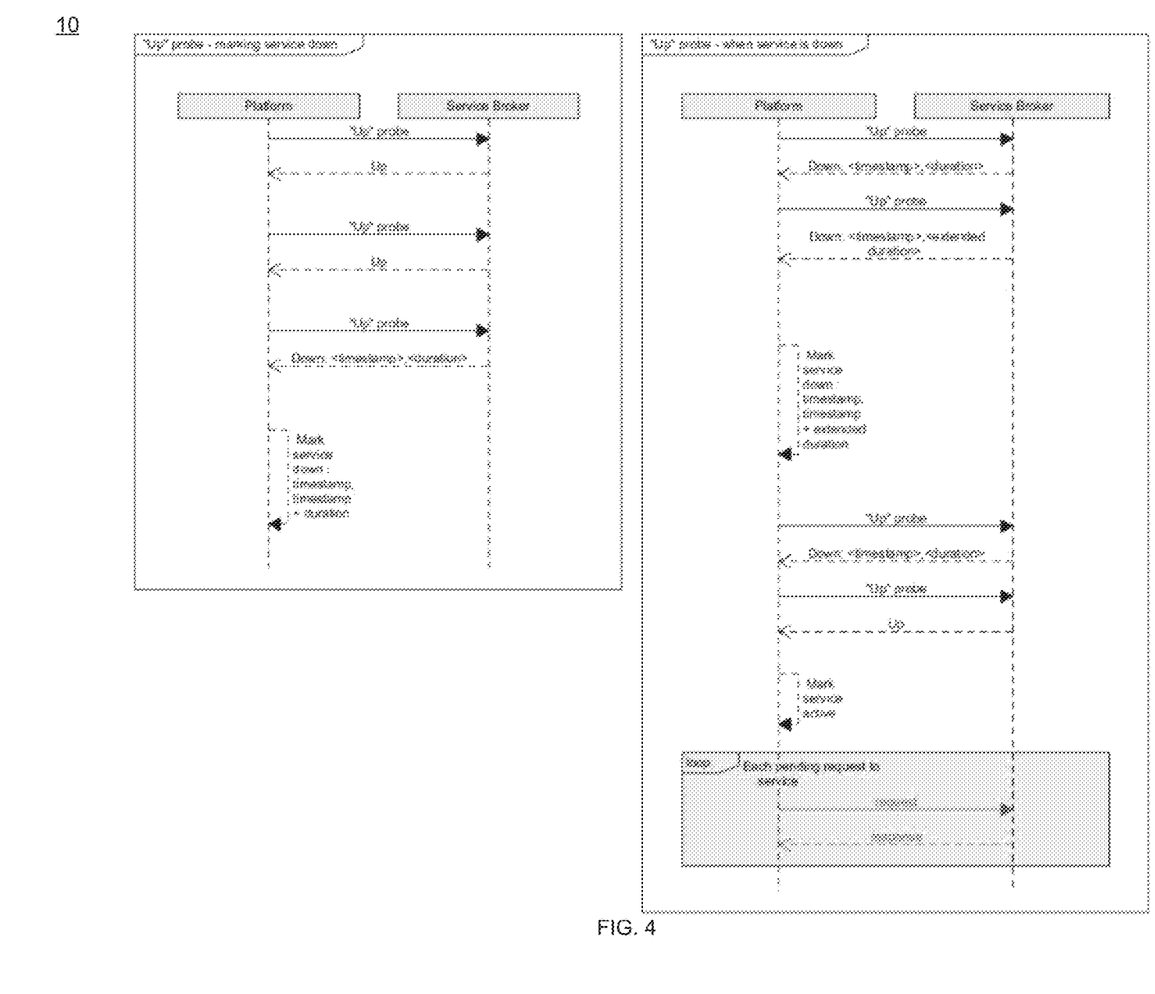
FIG. 4 is an alternative view of an example flowchart of a probe process according to one or more example implementations of the disclosure.
Figure 5:
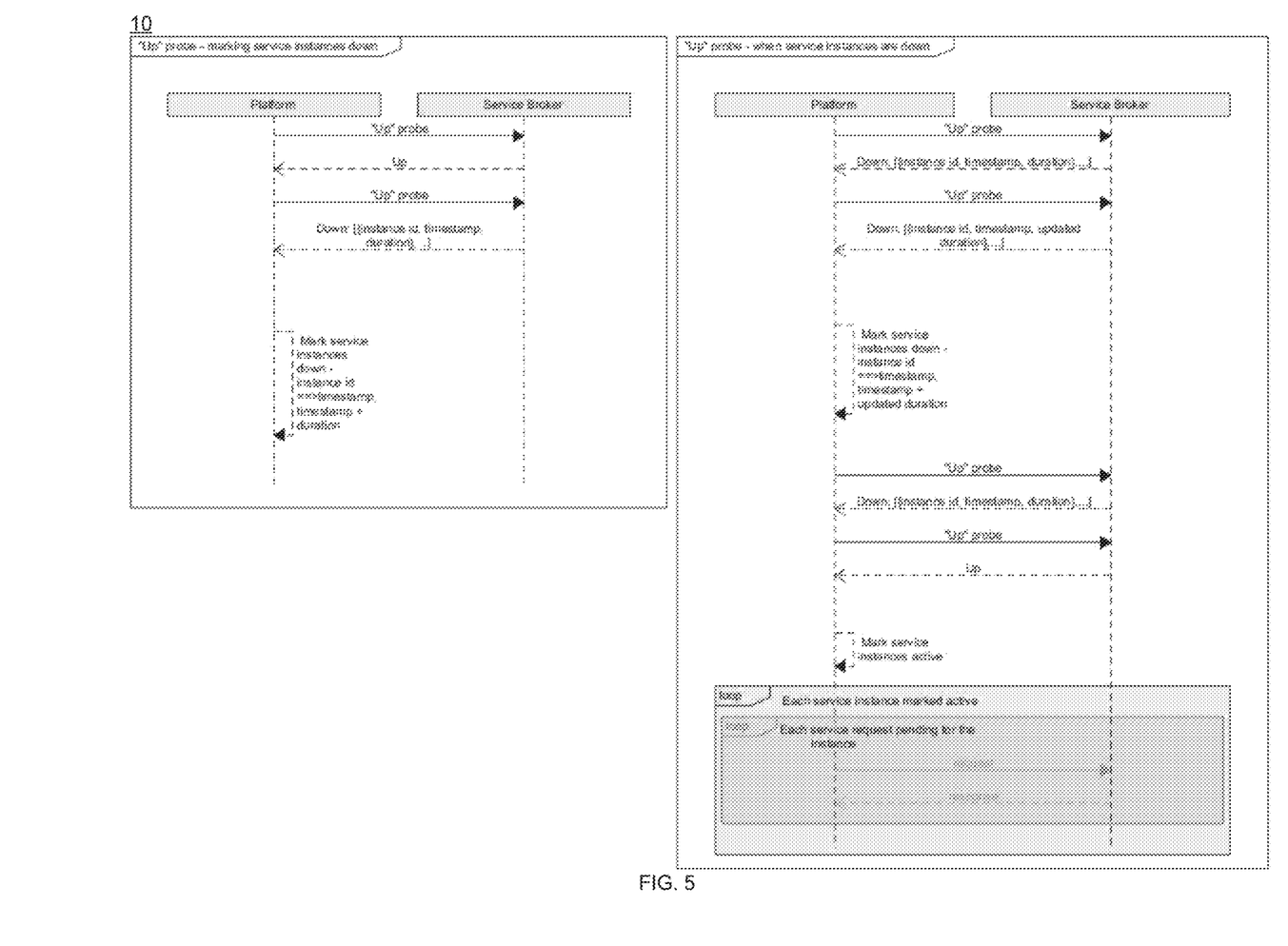
FIG. 5 is an alternative view of an example flowchart of a probe process according to one or more example implementations of the disclosure.

The Probe Process:

As discussed above and referring also at least to the example implementations of FIGS. 3-5, probe process 10 may receive 300, at a service broker on a first computing device, a status probe associated with at least a portion of a service, wherein the status probe may be sent from a platform on a second computing device. Probe process 10 may generate 302 a response to the status probe, wherein the response may include a status of at least the portion of the service, and wherein the response may further include additional information. Probe process 10 may send 304 the response with the status and the additional information to the platform.

In some implementations, probe process 10 may receive 300, at a service broker on a first computing device, a status probe associated with at least a portion of a service, wherein the status probe may be sent from a platform on a second computing device. For example, a service broker (e.g., located at the first computing device, such as computer 12) may receive 300 a status probe (e.g., I/O 15) from a platform (e.g., located at the second computing device, such as client electronic device 38). In some implementations, at least the portion of the service may include at least one of the service and one or more service instances of the service. For instance, in the example, the status probe may be a "heartbeat" or "up" probe request sent periodically (e.g., every minute) to identify the status of the service broker (e.g., the service and/or one or more of the service instances provisioned in that service, and whether they are up or down). To scale, probe process 10 may enable the platform to choose its own frequency to probe the service/instances it has provisioned and maintain the status in a cache. As used herein, the terms up probe, status probe, and/or heartbeat may be used interchangeably.

In some implementations, probe process 10 may generate 302 a response to the status probe, wherein the response may include a status of at least the portion of the service, and wherein the response may further include additional information. For example, when responding to the status probe, probe process 10 may generate 302 a response (e.g., I/O 17) to send back to the platform indicating the status of the service and/or one or more of the service instances provisioned in that service. In some implementations, the additional information may include a future expected down time of at least the portion of the service and/or an expected duration for down time of at least the portion of the service. For instance, the additional information may be included in a header of the response to the status probe. The service broker (e.g., via probe process 10) may include the additional information in its response header sent back to the platform to indicate if the service (or its instances) is currently down, when the service (or its instances) are expected to go down (e.g., for planned maintenance), and/or how long the service (or its instances) are expected to be down.

An example response header may include, e.g., X-<platform_name>-down-time: <Time stamp in UTC>, <down time in minutes>. In some implementations, probe process 10 may send 304 the response with the status and the additional information to the platform. For example, the response header with the status and the additional information may be handled as an extension to the pre-existing communication probe mechanism sent 304 between the platform and the service broker (via probe process 10). Similarly, the service (via probe process 10) may send 304 a list of service instances that are expected to be down for maintenance, experiencing unscheduled down time, and/or the estimated time when they would be up again. For instance, as an example response JSON

```
{
...
"down": [{
"instance_id" : "7e67396c-6b7f-11e7-907b-a6006ad3dba0",
"time": "2017-07-18T06:10:04+00:00"
"duration": 30
},{
"instance_id" : "f5a9aa1e-6b7f-11e7-907b-a6006ad3dba0",
"time": "2017-07-18T06:10:04+00:00"
"duration": 30
}
]
}
```

In some implementations, if the service (or its instances) is going down, the platform (via probe process 10) may capture this information (from the response) and may mark the service (or its instances) as inactive for the specified time period. As noted above, the information may be stored in a cache for subsequent access.

In some implementations, probe process 10 may receive 306 subsequent status probes from the platform at a geometric progression of interval frequency. For instance, during this scheduled down time interval, the status or "up" probe may continue to be sent (via probe process 10) to the service broker, but in a geometric progression of interval frequency with common ratio being, e.g., ½. For example, assume service broker (via probe process 10) marks its down time to start at 00:00 and schedule it for 30 minutes. In the example, the geometric progression of interval frequency with a common ratio of ½ may be sent/received as follows:
  First up probe at 00:15
  Second up probe at 00:23
  3rd up probe at 00:27
  4th up probe at 00:29
  5th up probe at 00:30, etc.

Even though the service broker has communicated the downtime, the platform (via probe process 10) may continue to send the probes. This helps with the service broker responding with an updated down time if any. For example, if initially communicated down time is 3 hours, but as the work progressed, the service broker (via probe process 10) identifies that it will be done in 2 hours, this continuing probe helps the service broker to communicate the updated down time or communicate that it is already up. Similarly, the service broker may determine (via probe process 10) it would require more than expected down time, it may be communicated the same way so that the platform may keep the users apprised.

To not to overload the service broker during the down time and to optimize the probing mechanism, instead of sending the probes in the regular interval, during down time, the probe may be sent in the above-noted geometric progression with ½ as the common ratio. Another example of such a progression is shown below:
  A service broker (via probe process 10) communicating a scheduled down time from 00:30 GMT to 02:30 GMT (2 hours). Until 00:29 the platform may continue to send the probe in the regularly scheduled interval (e.g., 1 minute). The service broker (via probe process 10) may communicate any change to the schedule until this point. Now, when the scheduled time kicks instead of keeping the probe in the scheduled interval it may be switched to a different interval (e.g., 01:30, 02:00, 02:15, 02:23, 02:27, 02:29):
  00:25—probe sent
  00:26—probe sent
  00:27—probe sent
  00:28—probe sent
  00:29—probe sent
  00:30—Down time kicks in, no probe
  01:30—probe sent
  02:00—probe sent
  02:15—probe sent, endpoint communicates it is up now earlier than expected
  02:16—probe sent, back to normal schedule
  02:17—probe sent . . .

In some implementations, the time interval may be capped, e.g., to a minute (but configurable in the platform or elsewhere) and adjusted at the minute boundary. For instance, while calculating when to send the next probe, the platforms may round it up to the minute boundary. In the previous example, after 02:15 as per the calculation, the next probe should be at 02:22:30, which was rounded to minute boundary of 02:23).

In some implementations, probe process 10 may generate 308 a response to at least one of the subsequent status probes with updates to the expected duration for down time in the additional information. This may make the down time window dynamic. For instance, assume that if during the first few minutes of down time it is found that the down time is going to take longer. In the example, a new extended window may be updated to reflect the longer duration in these up probes. The same may hold true if it is found that all of the originally published time window is not required and the down time can be shrunk dynamically. This additional information may also be automatically communicated back to the platform similarly to the above-noted additional information (e.g., via the response header of the probe response).

In some implementations, no service provisioning and/or management requests (if any) may be forwarded (via probe process 10) to the service broker by the platform, and the platform (via probe process 10) may mark any provisioning or management request as pending. Marking a service as down may be achieved in many ways. One technique may be to make an entry in the Service Broker Registry (Database entries) that the service broker is down and the down time interval. This marking may be how the platform identifies that a broker is experiencing down time and makes the decision of whether to forward the provisioning or management requests to that brand or not. It also may impact the "up probe" schedule.

In some implementations, any upstream service, such as User Interface (UI) or Command Line Interface (CLI) pushing these requests may be provided with information that the service (or its instances) is not available at the moment and the expected time when it is expected to be back again. In some implementations, the platform (via probe process 10) may implement a "hold" pattern, where they accept the request, let the users know when the request would be executed based on the provided down time duration, and/or how much down time has already elapsed. This may greatly enhance the user experience.

In some implementations, once the down time is over, probe process 10 may post a successful response to the received up probe, and if the platform has accepted requests when the service broker was down, all pending requests may be triggered adhering to a pre-defined throttling limit, in the order they were requested. Such a pre-defined throttling limit, as well as the specific method of processing the requests, may be configurable. Thus, the up probe may reverted to the normal schedule.

It will be appreciated that the present disclosure (and shown at least in FIG. 3 and FIG. 4) being applied to a service being down may apply similarly to one or more specific service instance(s) going down, but where the service itself is up (e.g., shown at least in FIG. 3 and FIG. 5) and vice versa. For example, in some implementations, the platform (via probe process 10) may capture the information on, e.g., which service instances are down, are planning to go down, and/or the expected down time of the service instances, and may mark the service instances inactive in that time period. Similarly as discussed above, the up probe may continue to be sent (via probe process 10) to the service broker in the established schedule, and any update to the individual service instance down time may be updated as part of the response to these probes.

In some implementations, no management requests (if) any for these service instances may be forwarded to the service broker by the platform. These requests may be marked as pending by probe process 10.

In some implementations, any upstream service, such as User Interface (UI) or Command Line Interface (CLI) pushing these requests may be provided with information that the specific service instance(s) is not available at the moment and the expected time when it is expected to be back again. In some implementations, the platform (via probe process 10) may implement a "hold" pattern, where they accept the request for it to be processed later instead of rejecting it and let the users know when the request would be executed based on the provided down time duration and how much has already elapsed. This may greatly enhance the user experience.

In some implementations, when the service instance is back up, the response to the next up probe may not contain that service instance (indicating the service instance is back up). The platform (via probe process 10) may mark them active again and if the platform has accepted requests when the service instances were down, the pending requests may be triggered adhering to a pre-defined throttling limit in the order they were requested.

Accordingly, probe process 10 may be advantageous for numerous example and non-limiting reasons. For example, probe process 10 may be dynamic, where down time may be scheduled with an aggressive estimation, as it may be dynamically extended or decreased without much overhead of communication (if required). Further, probe process 10 may fit into the existing REST form of communication, making it less expensive and easier to implement. Even further, the machine to machine communication of probe process 10 may make down time estimation and/or reporting less error prone, if, e.g., compared to the process being done by hand with human to human interaction between platform and service broker teams. Even further, API notification(s) from the service to the platform may have the drawback of it being a push instead of a pull. For the push to work, in some implementations, the service itself (via probe process 10) may need to be up and this may make the dynamic scheduling more difficult (or even impossible).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, at a service broker on a first computing device, a status probe associated with at least a portion of a service, wherein the status probe is sent from a platform on a second computing device;
generating a response to the status probe, wherein the response includes a status of at least the portion of the service, and wherein the response further includes additional information;
sending the response with the status and the additional information to the platform; and
receiving subsequent status probes from the platform at a geometric progression of interval frequency with a common predefined ratio.

2. The computer-implemented method of claim 1 wherein the additional information includes a future expected down time of at least the portion of the service.

3. The computer-implemented method of claim 1 wherein the additional information includes an expected duration for down time of at least the portion of the service.

4. The computer-implemented method of claim 1 wherein at least the portion of the service includes at least one of the service and one or more service instances of the service.

5. The computer-implemented method of claim 1 further comprising generating a response to at least one of the subsequent status probes with updates to the expected duration for down time in the additional information.

6. The computer-implemented method of claim 1 wherein the additional information is included in a header of the response to the status probe.

7. A computer program product residing on a computer readable storage medium having a plurality of instructions stored thereon which, when executed across one or more processors, causes at least a portion of the one or more processors to perform operations comprising:
  receiving, at a service broker on a first computing device, a status probe associated with at least a portion of a service, wherein the status probe is sent from a platform on a second computing device;
  generating a response to the status probe, wherein the response includes a status of at least the portion of the service, and wherein the response further includes additional information;
  sending the response with the status and the additional information to the platform; and
  receiving subsequent status probes from the platform at a geometric progression of interval frequency with a common predefined ratio.

8. The computer program product of claim 7 wherein the additional information includes a future expected down time of at least the portion of the service.

9. The computer program product of claim 7 wherein the additional information includes an expected duration for down time of at least the portion of the service.

10. The computer program product of claim 7 wherein at least the portion of the service includes at least one of the service and one or more service instances of the service.

11. The computer program product of claim 7 wherein the instructions further comprise generating a response to at least one of the subsequent status probes with updates to the expected duration for down time in the additional information.

12. The computer program product of claim 7 wherein the additional information is included in a header of the response to the status probe.

13. A computing system including one or more processors and one or more memories configured to perform operations comprising:
  receiving, at a service broker on a first computing device, a status probe associated with at least a portion of a service, wherein the status probe is sent from a platform on a second computing device;
  generating a response to the status probe, wherein the response includes a status of at least the portion of the service, and wherein the response further includes additional information;
  sending the response with the status and the additional information to the platform; and
  receiving subsequent status probes from the platform at a geometric progression of interval frequency with a common predefined ratio.

14. The computing system of claim 13 wherein the additional information includes a future expected down time of at least the portion of the service.

15. The computing system of claim 13 wherein the additional information includes an expected duration for down time of at least the portion of the service.

16. The computing system of claim 13 wherein at least the portion of the service includes at least one of the service and one or more service instances of the service.

17. The computing system of claim 13 wherein the additional information is included in a header of the response to the status probe.

* * * * *